(12) United States Patent
Feldner (10) Patent No.: US 9,705,259 B2
(45) Date of Patent: Jul. 11, 2017

(54) ELECTRICAL CONNECTOR PART HAVING A RESISTANCE CODING

(71) Applicant: Phoenix Contact E-Mobility GmbH, Schieder-Schwalenberg (DE)

(72) Inventor: Ralf Feldner, Detmold (DE)

(73) Assignee: PHOENIX CONTACT E-MOBILITY GMBH, Schieder-Schwalenberg (DE)

( * ) Notice: Subject to any disclaimer, the term of this patent is extended or adjusted under 35 U.S.C. 154(b) by 0 days.

(21) Appl. No.: 15/023,726

(22) PCT Filed: Sep. 22, 2014

(86) PCT No.: PCT/EP2014/070085
§ 371 (c)(1),
(2) Date: Mar. 22, 2016

(87) PCT Pub. No.: WO2015/044068
PCT Pub. Date: Apr. 2, 2015

(65) Prior Publication Data
US 2016/0233622 A1     Aug. 11, 2016

(30) Foreign Application Priority Data
Sep. 24, 2013   (DE) .......................... 10 2013 110 548

(51) Int. Cl.
*H01R 13/00*   (2006.01)
*H01R 13/66*   (2006.01)
(Continued)

(52) U.S. Cl.
CPC ........ *H01R 13/6616* (2013.01); *B60L 11/185* (2013.01); *B60L 11/1818* (2013.01);
(Continued)

(58) Field of Classification Search
CPC .................................................. H01R 13/6616
(Continued)

(56) References Cited

U.S. PATENT DOCUMENTS 4,471,339 A * 9/1984 Fukada ................. H01C 10/32
338/162
4,915,639 A * 4/1990 Cohn ................. G06K 7/10861
307/116

(Continued)

FOREIGN PATENT DOCUMENTS

DE            3440748 A1     5/1986
DE      102009023292 A1    12/2010
(Continued)

*Primary Examiner* — Neil Abrams
(74) *Attorney, Agent, or Firm* — Leydig, Voit & Mayer, Ltd.

(57) ABSTRACT

An electrical connector part for transmitting a charging current has at least two contact elements for producing an electrical contact having associated contact elements of another electrical connector part, a support element on which the at least two contact elements are disposed, and a resistance device which is electrically connected to the at least two contact elements. The resistance device has a circuit board, an electrical resistor disposed on the circuit board, and at least one contact spring disposed on the circuit board and electrically connected to the resistance, the circuit board being retained on the support element and the at least one contact spring electrically contacts one of the at least two contact elements. Thus, an electrical connector part can be created which in a simple manner enables the integration of a resistance device into an electrical connector part for the purpose of a resistance coding to provide identification information to an electrical plug to be mated to the electrical connector part.

10 Claims, 4 Drawing Sheets

(51) Int. Cl.
*B60L 11/18* (2006.01)
*H01R 43/20* (2006.01)
*H01R 12/57* (2011.01)
*H01R 24/70* (2011.01)
*H01R 27/00* (2006.01)

(52) U.S. Cl.
CPC ....... *B60L 11/1824* (2013.01); *B60L 11/1846* (2013.01); *B60L 11/1864* (2013.01); *H01R 43/20* (2013.01); *H01R 12/57* (2013.01); *H01R 24/70* (2013.01); *H01R 27/00* (2013.01); *Y02T 10/7005* (2013.01)

(58) Field of Classification Search
USPC ............................ 439/76.1, 620.22, 955, 489
See application file for complete search history.

(56) References Cited

U.S. PATENT DOCUMENTS

| | | | | |
|---|---|---|---|---|
| 5,327,066 | A * | 7/1994 | Smith | B60L 11/1824 235/381 |
| 5,413,493 | A * | 5/1995 | Hoffman | B60L 11/1818 200/51.09 |
| 5,491,418 | A * | 2/1996 | Alfaro | G01R 31/007 307/10.1 |
| 5,569,053 | A | 10/1996 | Nelson et al. | |
| 5,577,937 | A | 11/1996 | Itoh et al. | |
| 5,758,414 | A * | 6/1998 | Ehrenfels | B60L 11/1818 29/857 |
| 5,822,427 | A * | 10/1998 | Braitberg | H02J 7/0004 340/7.63 |
| 6,067,008 | A * | 5/2000 | Smith | B60L 11/1824 320/109 |
| 6,139,345 | A * | 10/2000 | Muzslay | H01R 13/6608 439/189 |
| 6,644,984 | B2 | 11/2003 | Vista, Jr. | H01R 9/091 439/76.1 |
| 6,968,994 | B1 * | 11/2005 | Ashwood Smith | G01R 31/023 235/375 |
| 7,314,392 | B2 * | 1/2008 | Pharn | H01R 13/641 439/489 |
| 7,318,744 | B2 * | 1/2008 | Kuo | H01R 13/641 439/489 |
| 7,859,219 | B2 * | 12/2010 | Harris | B60L 11/1818 320/104 |
| 7,896,702 | B2 * | 3/2011 | Stiehl | H01R 24/30 439/620.22 |
| 7,914,310 | B2 * | 3/2011 | Johansson | H01R 13/502 439/284 |
| 7,983,064 | B2 * | 7/2011 | Zhang | H01R 12/718 363/146 |
| 8,449,318 | B2 * | 5/2013 | Beller | A61B 18/14 439/489 |
| 8,480,410 | B2 * | 7/2013 | Early | H01R 13/665 439/620.21 |
| 8,608,489 | B2 * | 12/2013 | Nogami | H01R 13/6658 439/377 |
| 8,610,554 | B2 * | 12/2013 | Liu | B60L 3/0069 320/107 |
| 8,619,413 | B2 * | 12/2013 | Gausepohl | H01R 13/5216 174/50 |
| 8,723,477 | B2 * | 5/2014 | Gaul | B60L 3/0069 320/109 |
| 8,900,006 | B2 * | 12/2014 | Gaul | B60L 11/1818 439/489 |
| 8,983,875 | B2 * | 3/2015 | Shelton | B60L 3/0069 320/104 |
| 9,024,581 | B2 * | 5/2015 | McGinley | H01R 31/065 320/111 |
| 9,379,495 | B2 * | 6/2016 | Valadas | G02B 6/3817 |
| 2003/0153200 | A1 | 8/2003 | Vista et al. | |
| 2004/0219823 | A1 | 11/2004 | Greene et al. | |
| 2007/0126395 | A1 * | 6/2007 | Suchar | B60L 1/003 320/109 |
| 2008/0182442 | A1 * | 7/2008 | Choi | H01R 13/642 439/166 |
| 2016/0233622 | A1 * | 8/2016 | Feldner | H01R 13/6616 |

FOREIGN PATENT DOCUMENTS

| | | |
|---|---|---|
| DE | 102010053074 A1 | 8/2011 |
| DE | 202012100613 U1 | 5/2012 |
| EP | 1094566 B1 | 4/2001 |

* cited by examiner

ELECTRICAL CONNECTOR PART HAVING A RESISTANCE CODING

CROSS-REFERENCE TO RELATED APPLICATIONS

This application is a U.S. national stage application under 35 U.S.C. §371 of International Application No. PCT/EP2014/070085, filed on Sep. 22, 2014, and claims benefit to German Patent Application No. DE 10 2013 110 548.3, filed on Sep. 24, 2013. The International Application was published in German on Apr. 2, 2015, as WO 2015/044068 A1 under PCT Article 21(2).

FIELD

The invention relates to an electrical plug connector part for transmitting a charging current, and a method for producing an electrical connector part.

BACKGROUND

An electrical plug connector part may have at least two contact elements for establishing an electrical contact with associated contact elements of another electrical plug connector part. The at least two contact elements are disposed on a support element of the electrical plug connector part and are retained in position via the support element.

Electrical plug connector parts of the type described here function to transmit a charging current, in particular for charging an electric vehicle. In general, an electric vehicle is hereby charged via a charging station, wherein the electric vehicle has, for example, an electrical plug connector part in the form of a charging socket which may be connected to the charging station via a suitable charging cable.

Basically, an electric vehicle may be charged in different ways. As such, there are also different corresponding connecting devices known from the prior art which connect an electric vehicle to a charging station, and these devices may have different electrical plug connector parts. For example, a connection device may be designed for transmitting an alternating current in order to supply a charging current in the form of alternating current to the electric vehicle. Upon connecting an electric vehicle to a socket, a single-phase alternating current, for example, is transmitted. However, a three-phase alternating current may also be supplied via a charging station. Alternatively, the charging may also be carried out by means of a direct current. Therefore, depending on the type of current and the current strength, the electrical plug connector parts are designed for connecting the electric vehicle to a charging station or to a socket.

In order to ensure that, upon connection of the electric vehicle to a charging station via a charging cable, a charging current supplied to the electric vehicle does not exceed a permissible maximum current strength for which the charging cable and the charging system of the electric vehicle are designed, a resistance coding is used at electrical plug connector parts, as is described, for example, in DE 10 2010 053 074 A1 and DE 20 2012 100 613 U1, and as has in addition been standardized in the relevant IEC 62196 standard.

For example, a resistance in a plug connector of a charging cable may be switched between a so-called proximity contact and a ground contact; the resistance value of the resistance may be measured via a charging station upon connecting the plug connector to the charging station in order to identify, on the basis of the resistance value, the type of charging cable connected. In the process, specific types of charging cables or charging devices are assigned to different resistance values so that the cable type can be identified based on the resistance value. In particular, a permissible maximum current strength (for example 16 A or 32 A) which may be transmitted via a charging cable, for example, may be identified in this way so that the charging station can correspondingly limit a supplied current.

A resistance coding, for example on an electrical plug connector part in the form of a charging socket on an electric vehicle, serves a similar purpose. In this case, a maximum permissible charging current for which the charging system of the electrical vehicle is designed may be identified on the basis of a resistance value.

Conventionally, the disposition of such a resistance for the purpose of resistance coding on an electrical plug connector part is comparatively expensive and requires a connection of a resistance to assigned contact elements through crimping or the like, for example.

An electrical plug connector is known from EP 1 094 566 B1, in which a metal sheet with a resistance chip disposed thereon is situated between two contact pins and is switched between the contact pins.

From DE 10 2009 023 292 A1, a known electrical connector is provided with a contact bridge which short circuits two contact pins.

SUMMARY

An aspect of the invention provides an electrical plug connector part for transmitting a charging current, the part comprising: a first and a second contact element configured to establish an electrical contact with assigned contact elements of a further electrical plug connector part; a support element on which the first and second contact elements are disposed; and a resistance device which is electrically connected to the first and second contact elements, wherein the resistance device includes a circuit board, an electrical resistor disposed on the circuit board, and a contact spring disposed on the circuit board and electrically connected to the resistor, wherein the circuit board is retained on the support element, and wherein the contact spring electrically contacts one of the first and second contact elements.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

An aspect of the present invention provides an electrical plug connector part and a method for producing an electrical plug connector part which enables in an easy way the integration of a resistance device into an electrical plug connector part for the purpose of resistance coding.

According to an aspect of the invention, the resistance device has a circuit board, an electrical resistance disposed on the circuit board, and at least one contact spring disposed on the circuit board and electrically connected to the resistance, wherein the circuit board is retained on the support element and the at least one contact spring electrically contacts one of the at least two contact elements.

The present invention arises from the concept of designing a modular resistance device by using a circuit board and a resistance disposed thereon. The resistance device may be disposed in an easy way on the support element of the electrical plug connector part and is fixedly retained on the support element in an assembled state. Because a contact is formed between the resistance and an assigned contact element via a contact spring disposed on the circuit board, the electrical contact of the resistance to the assigned contact element may be produced in a simple, easy to assemble way, in that the contact spring and the assigned contact element are brought into contact with one another. By this means, the requirement, in particular, for an expensive connection of the resistance to an assigned contact element during assembly, for example, by crimping, is omitted, so that the assembly of the electrical plug connector part is simplified overall.

Preferably, two contact springs are disposed on the circuit board, a first of said contact springs electrically contacting a first of the at least two contact elements, and a second contact spring electrically contacting a second of the at least two contact elements. The resistance is thus electrically connected to the assigned contact elements via the two contact springs such that the resistance is electrically switched between the contact elements. The contact springs are designed to be elastic at least in sections and may be brought into flexible contact with the assigned contact element such that upon contacting of the contact springs with the assigned contact elements the contact springs are under pretension, and thus a reliable, low-resistance contact may be established between the contact springs and the assigned contact elements.

Preferably, the contact springs are disposed on different sides of the circuit board.

Thus, the circuit board has a first side and a second side facing away from the first side.

The first contact spring may hereby be disposed on the first side and the second contact spring on the second side facing away from the first side, such that the contact springs protrude from the circuit board on different sides. In the process, the resistance is also disposed on one of the sides, for example the first side. Suitable conductor paths that electrically contact the contact springs to the resistance, extend on the circuit board.

However, it is also possible that the contact springs are disposed on the same side of the circuit board.

The circuit board (printed circuit board, PCB) embodies, as per usual, a support for electrical components and is made of, for example, an electrically insulating base body on which conducting paths are disposed.

To establish the electrical contact between the contact spring and the assigned contact element, the contact spring preferably has a contact surface which, in the assembled state of the electrical plug connector part, is in contact with a cylindrical contact section of the assigned contact element. The contact surface of the contact spring is spaced away from the side of the circuit board on which the contact spring is disposed, and is thus at a distance from the side. The contact surface is connected to the assigned side of the circuit board via a spring arm and is thus flexibly retained on the circuit board.

The contact section does not necessarily have to be cylindrical in shape, in particular as a circular cylinder, but may also have another shape, for example a rectangular or otherwise multi-cornered cross-section.

In an advantageous embodiment, the circuit board is retained in an interlocking way on a retaining device of the support element. For example, the circuit board can be inserted into the retaining device such that the retaining device encompasses the circuit board at least in sections and the circuit board is thus fixedly inserted on the support element. A simple assembly process results, in which the resistance device with the circuit board may be immobilized in a simple way by way of insertion into the retaining device on the support element.

The resistance and/or the at least one contact spring of the resistance device may be advantageously designed as SMD components and may be fixed on the circuit board by means of soldering. In contrast to components in push-through installation, SMD components have no wire connections, but instead are soldered directly to a circuit board using solderable connection surfaces.

The fixing of such components on the circuit board is thus carried out using surface mounting assembly without having to guide connection wires through component mounting holes in the circuit board.

Basically, however, the components may also be disposed on the circuit board using through-hole installation.

The resistance of the resistance device is used for resistance coding in particular. Correspondingly, the resistance is preferred to have a resistance value assigned to a predetermined identification information so that the resistance value can be used to identify the identification information via another electrical plug connector part connected to the electrical plug connector part. For example, if the electrical plug connector part embodies a charging plug connector of a charging cable, then upon connecting the charging plug connector to a charging station, for example, the resistance value of the resistance of the resistance device in the charging plug connector of the charging cable may be measured via a suitable measuring device of the charging station. The measured resistance value, which is assigned to a predefined identification information in a standardized way, can be used to identify the identification information. The identification information may indicate, for example, a maximum permissible charging current (for example 16 A or 32 A), information about a type of charging cable or about a charging device of an electric vehicle, or also other information about an electrical plug connector part or a charging system.

In an embodiment, the present invention also provides a method for producing an electrical plug connector part for transmitting a charging current, wherein the electrical plug connector part has at least two contact elements for establishing an electrical contact with assigned contact elements of another electrical plug connector part, a support element on which the at least two contact elements are disposed, and a resistance device which is electrically connected to the at least two contact elements.

It is thereby provided that the resistance device has a circuit board, an electrical resistance disposed on the circuit board, and at least one contact spring disposed on the circuit board and electrically connected to the resistance, wherein the circuit board is disposed on the support element and then the at least one contact element is applied onto the support element in such a way that the at least one contact spring electrically contacts one of the at least two contact elements.

Regarding advantages and advantageous embodiments of the method, reference is made to the preceding explanation, which is used analogously for the method.

Figure 1:
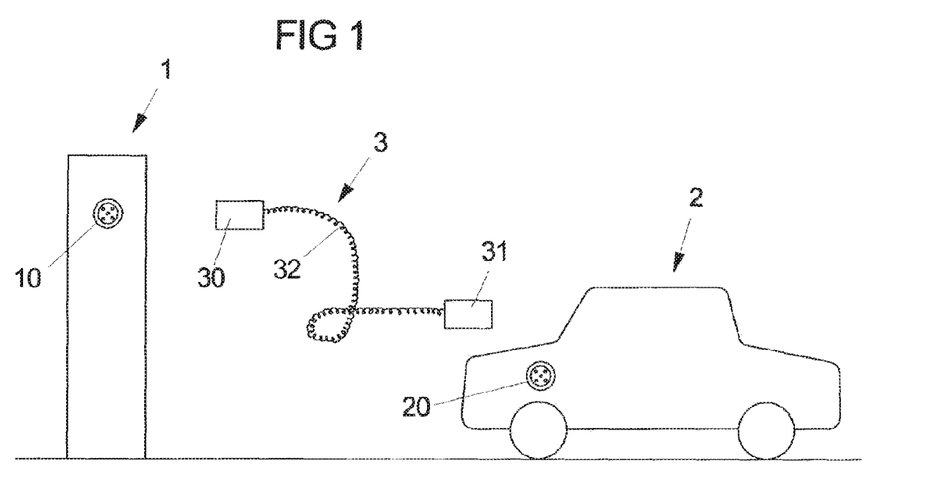
FIG. 1 a schematic view of an electric vehicle to be connected to a charging station via a charging cable.

FIG. 1 shows in a schematic view a vehicle 2 which has an electric drive and an electric charging system with a storage device in the form of rechargeable batteries for supplying the electric drive (colloquially designated as an "electric vehicle"). Vehicle 2 may be connected to a charging station 1 for charging the vehicle batteries via a charging cable 3, wherein an electrical plug connector part 20, 10 is provided both at vehicle 2 and also at charging station 1, respectively, in the form of a charging socket which may be engaged with electrical plug connector parts 30, 31 in the form of charging plugs of charging cable 3. If vehicle 2 is connected to charging station 1 via charging cable 3, electrical current may flow to vehicle 2 for charging the batteries of vehicle 2 via a cable 32 of charging cable 3.

A charging current may be transmitted basically as direct current or as alternating current, and charging cable 3 and the electrical plug connector parts 10, 20, 30, 31 used may be accordingly configured in different ways.

Figure 2:
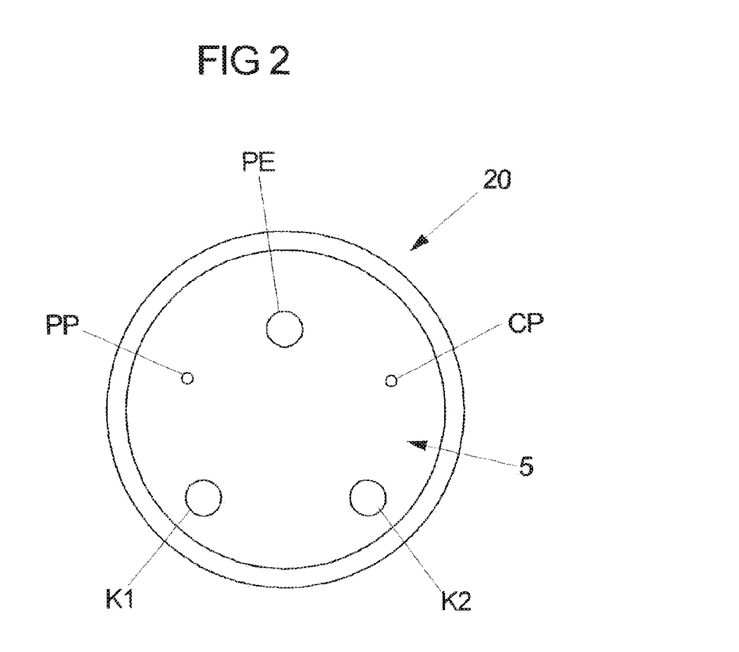
FIG. 2 a schematic view of an exemplary plug region of an electrical plug connector part.

FIG. 2 shows schematically a plug region 5 of an electrical plug connector part 20, which is disposed as a charging socket, for example, on a vehicle 2, and may function to transmit a charging current in the form of a single-phase alternating current. Electrical plug connector part 20 comprises five contacts in plug region 5 thereof, of which two contacts K1, K2 function as load contacts for transmitting alternating current to vehicle 2. Via load contacts K1, K2, a single-phase alternating current, for example, may be transmitted from a conventional plug socket to vehicle 2, such that vehicle 2 may be supplied by connecting to a socket and thus via the conventional electrical supply network (load contacts K1, K2 are also designated as L conductors and N conductors in this case). Plug region 5 further has a ground conductor contact PE which is connected to a ground conductor, a pilot contact CP for transmitting control signals, and a proximity contact PP.

It should be noted at this point, that electrical plug conductor part 20 shown in FIG. 2 with the configuration of its contacts K1, K2, CP, PE, PP is to be understood merely as an example. Basically, another contact configuration, for example for transmitting three-phase alternating current or for transmitting direct current, may also be provided, wherein depending on the design of electrical plug connector part 20, the number of contacts K1, K2, CP, PE, PP may vary. For example, an electrical plug connector part 20 for transmitting three-phase alternating current usually has four load contacts for transmitting the three-phase alternating current and a total of seven contacts.

With regard to charging plugs and charging sockets, a resistance coding is usually provided, which functions for the purpose of coding an identification information of an electrical plug connector part 10, 20, 30, 31, or of a charging system, e.g. charging cable 3, or of a charging system of vehicle 2. For example, the resistance coding can be used to code the charging current for which a charging system, for example charging cable 3, is designed; for example 16 A or 32 A. Such a resistance coding, which can be read by charging station 1, for example, can enable charging station 1 to identify the maximum permissible charging current such that a charging current transmitted via charging cable 3 may be limited, thus ensuring that charging cable 3 of a vehicle 2 connected via charging cable 3 is not overloaded.

Figure 3:
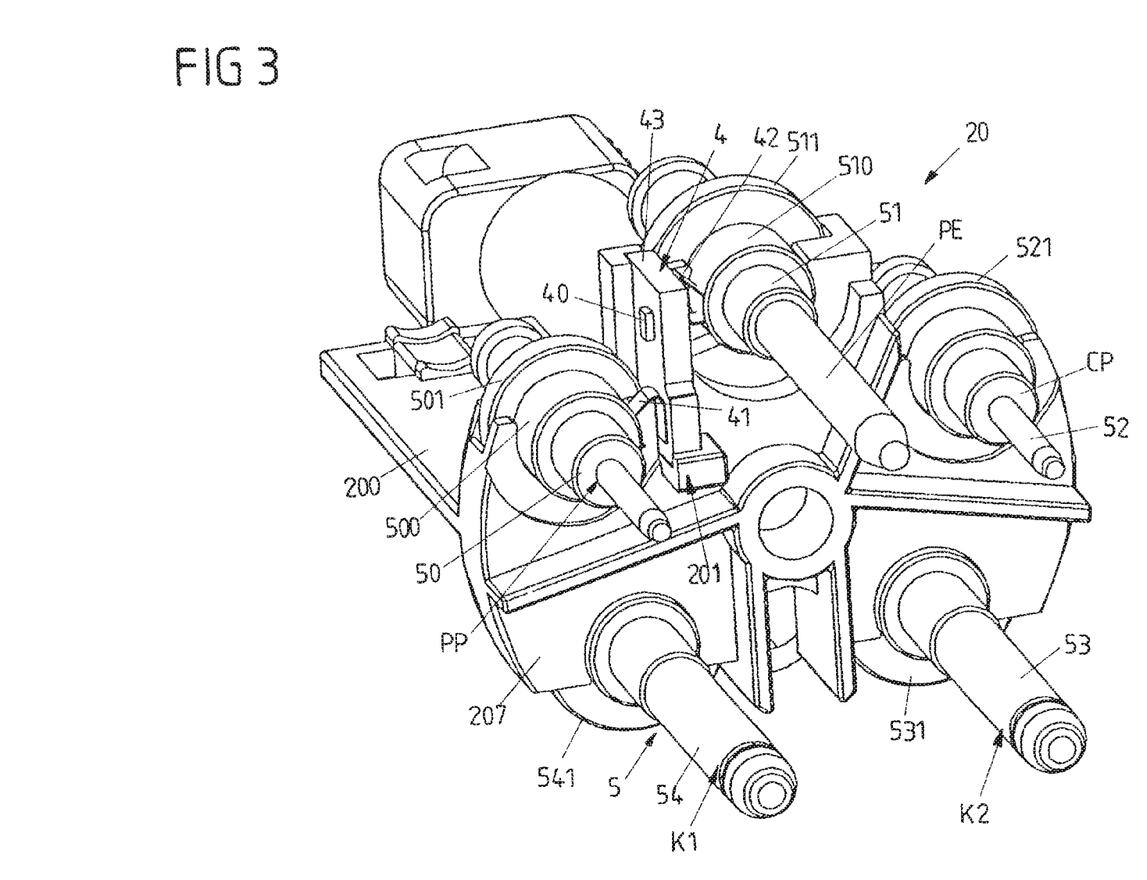
FIG. 3 a view of a support element of an electrical plug connector part with contact elements and a resistance device disposed thereon.
Figure 4:
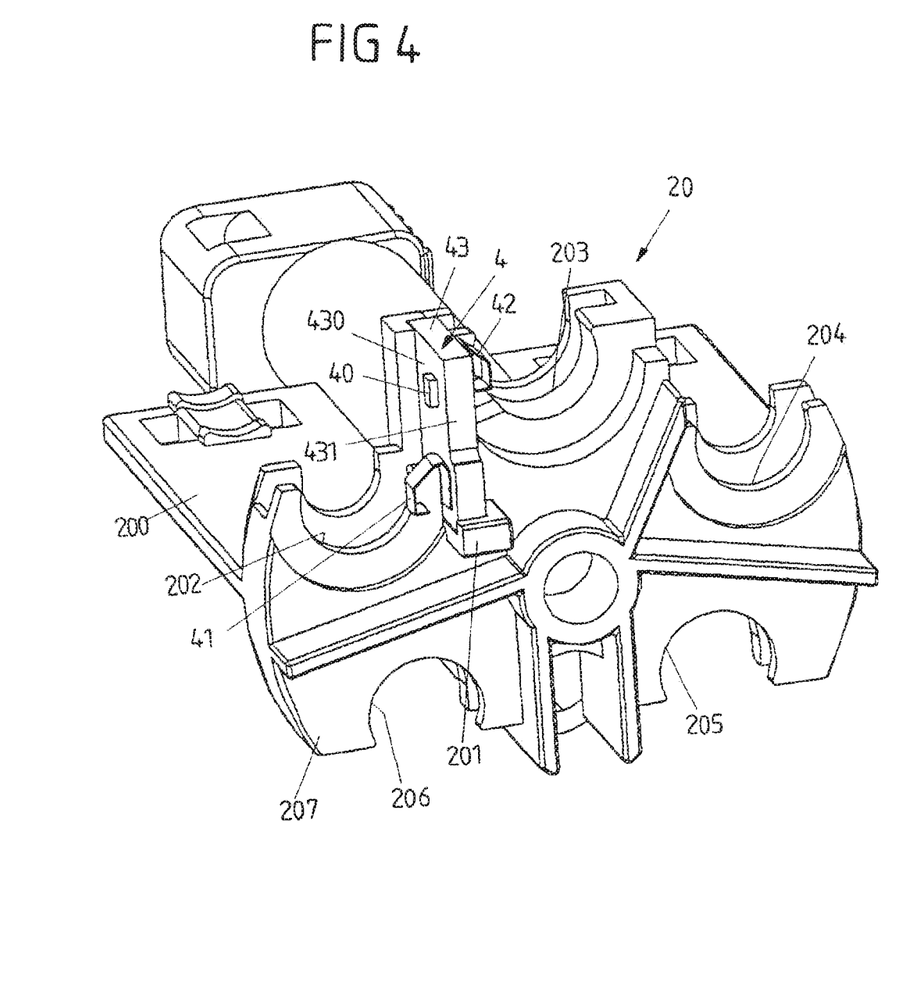
FIG. 4 a view of the support element without the contact elements.
Figure 5:
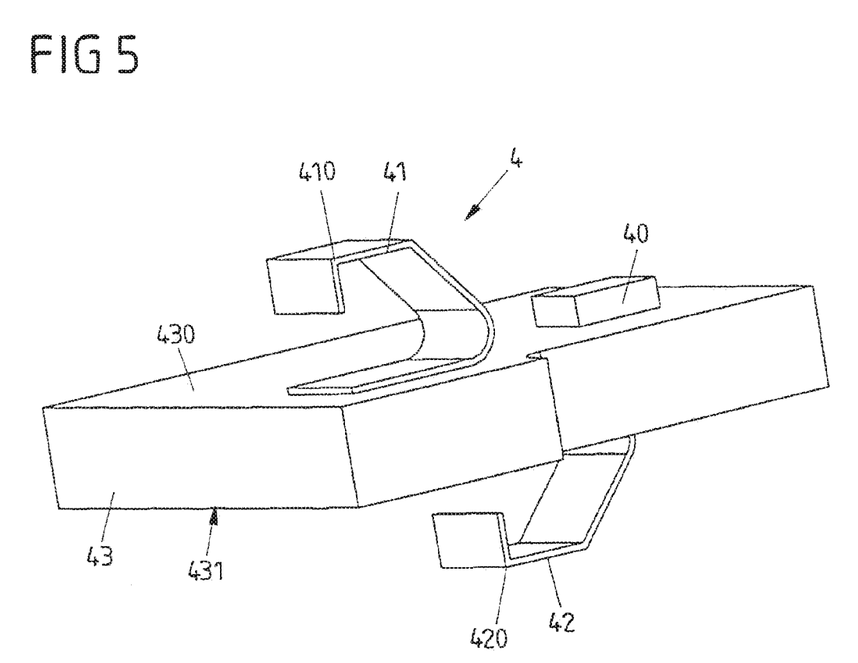
FIG. 5 a separate view of a resistance device with a circuit board, a resistance, and contact springs for contacting two contact elements.

For resistance coding, a resistance device 4, as is shown according to FIGS. 3 to 5, is connected on a support element 200 of an electrical plug connector part 20 in such a way that a resistance 40 disposed on a circuit board 43 is electrically switched between two contact elements 50, 51 assigned to contacts PP and PE (see FIG. 2). The resistance value of resistance 40 may be read via contacts PP, PE, wherein identification information, for example, a maximum permissible charging current, is coded on the basis of the resistance value so that conclusions about the identification information may be drawn by measuring the resistance value.

In the embodiment shown, a total of five contact elements 50-54 are disposed on support element 200 in the form of contact pins for providing the five contacts K1, K2, CP, PE, PP. Contact elements 50-54 are each hereby configured substantially rotationally symmetrically and inserted into an assigned receptacle opening 202-206 of support element 200 using a collar 501-541, so that the contact elements 50-54 are immovably retained in position via support element 200.

Contact elements 50-54 are disposed in an interlocking way on support element 200 in such a way that contact elements 50-54 protrude past a bottom 207 of support element 200 in a pin-like way. Using the protruding ends, contact elements 50-54 may engage in an electrically contacting way with another assigned electrical plug connector part such that another electrical plug connector part, for example a plug connector 31 of a charging cable 3, may be connected to electrical plug connector part 20 via contact elements 50-54.

Resistance device 4 with circuit board 43 is inserted into a retaining device 201 of support element 200 such that resistance device 4 is retained in an interlocking way on support element 200. Retaining device 201 is disposed on bottom 207 of support element 200 such that resistance device 4 is retained on bottom 207 of support element 200.

As is apparent from the separate view according to FIG. 5, the elastic flexible contact springs 41, 42 made of metal spring strips are disposed on different sides 430, 431 of circuit board 43 such that contact springs 41, 42 protrude from circuit board 43 on different sides 430, 431.

Each contact spring 41, 42 hereby has a contact surface 410, 420 which is spaced at a distance from the side 430, 431 of circuit board 43 on which the respective contact springs 41, 42 are disposed. Contact surfaces 410, 420 thus lie at a distance from the respectively assigned surface of circuit board 43 and are each elastically flexibly connected to circuit board 43 via a spring arm.

Contact springs 41, 42 and resistance 40 are designed in the embodiment shown as SMD components and are thus mounted on the respectively assigned surface of circuit board 43. On circuit board 43, suitable conductor paths are provided for electrical contacting of resistance 40 to first contact spring 41 on one side and to second contact spring 42 on the other side such that resistance 40 is electrically connected to both contact springs 41, 42.

In the assembled state, shown in FIG. 3, circuit board 43 is inserted into retaining device 201 of support element 200 and thus retained on support element 200. With regard to contact elements 50-54 attached to support element 200, contact springs 41, 42 are contacted via the contact surfaces 410, 420 thereof to cylindrical contact sections 500, 510 of assigned contact elements 50, 51 (contacts PP, PE), wherein the contacting is carried out under at least slight spring pretension such that a reliable electrical contacting of contact springs 41, 42 to assigned contact elements 50, 51 is ensured.

Contact sections 500, 510 of contact elements 50, 51 connect to respective collar 501, 541 of assigned contact elements 50, 51 and protrude past bottom 207 of support element 200 such that contact springs 41, 42 may electrically contact contact sections 500, 510.

Support element 200 is produced from an electrically insulating material, for example, from a plastic material. Circuit board 43 may be produced from conventional circuit board materials, for example, from a fiberglass mat saturated with epoxy resin, wherein conductor paths may be disposed on one or on both sides 430, 431 of circuit board 43. If necessary, additional electrical or electronic components may also be disposed on circuit board 43.

The concept underlying the invention is not limited to the preceding embodiments depicted, but instead may also be realized by embodiments of substantially different types.

In particular, the provision of a resistance coding of the type described here is basically conceivable and possible for any configuration of electrical plug connector parts for transmitting direct current or alternating current. A resistance coding may also be used in the case of so-called combination plugs, which may be used for the transmission of alternating current and for the transmission of direct current.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

LIST OF REFERENCES

1 Charging station
10 Socket/Electrical plug connector part
2 Vehicle
20 Socket/Electrical plug connector part
200 Support element
201 Retaining device
202-206 Receptacle opening
207 Bottom
3 Charging cable
30, 31 Plug/Electrical plug connector part
32 Cable
4 Resistance device
40 Resistance
41,42 Contact spring
410, 420 Contact surface
43 Circuit board
430,431 Side
5 Plug region
50-54 Contact elements
500,510 Contact section
501-541 Collar
CP Pilot contact
K1, K2 Load contact
PE Ground conductor contact
PP Proximity contact

The invention claimed is:

1. An electrical plug connector part for transmitting a charging current, the part comprising:
a first and a second contact element configured to establish an electrical contact with assigned contact elements of a further electrical plug connector part;
a support element on which the first and second contact elements are disposed; and
a resistance device which is electrically connected to the first and second contact elements,
wherein the resistance device includes a circuit board, an electrical resistor disposed on the circuit board, and a contact spring disposed on the circuit board and electrically connected to the resistor,
wherein the circuit board is retained on the support element, and
wherein the contact spring electrically contacts one of the first and second contact elements,
wherein the resistor has a resistance value which is assigned to a predetermined identification information, such that the identification information can be identified using the further electrical plug connection part connected to the part based on the resistance value.

2. The part of claim 1, comprising a first and a second contact spring, disposed on the circuit board,
wherein the first contact spring electrically contacts the first contact element, and
wherein the second contact spring electrically contacts the second contact element,
such that the electrical resistor is electrically connected to the first and second contact elements via the first and second contact springs.

3. The part of claim 2, wherein the circuit board includes a first side and a second side facing away from the first side, and
wherein the first contact spring is disposed on the first side and the second contact spring is disposed on the second side such that the first and second contact springs project from the circuit board on different sides thereof.

4. The part of claim 1, wherein the contact spring includes a contact surface which is in contact with a cylindrical contact section of an associated contact element.

5. The part of claim 1, wherein the circuit board is retained in an interlocking way on a retaining device of the support element.

6. The part of claim 5, wherein the circuit board is inserted into the retaining device.

7. The part of claim 1, wherein the resistor is configured as an SMD component and is fixed to the circuit hoard soldering.

8. The part of claim 1, wherein the contact spring is configured as an SMD component and is fixed to the circuit board soldering.

9. A method for producing an electrical plug connector part for transmitting a charging current, the electrical plug connector part including a first and a second contact element configured to establish an electrical contact with assigned contact elements of a further electrical plug connector part, a support element on which the at least two contact elements are disposed, and a resistance device which is electrically connected to the at least two contact elements, the resistance device including a circuit board, an electrical resistor disposed on the circuit board, and a contact spring disposed on the circuit board and electrically connected to the electrical resistor, the method comprising:

disposing the circuit board on the support element; and then     applying the first and/or second contact element to the support element such that the contact spring electrically contacts one of the first and second contact elements,     wherein the resistor has a resistance value which is assigned to a predetermined identification information, such that the identification information can be identified using the further electrical plug connection part connected to the part based on the resistance value.

10. An electrical plug connector part for transmitting a charging current, the part comprising:

a first and a second contact element configured to establish an electrical contact with assigned contact elements of a further electrical plug connector part;

a support element on which the first and second contact elements are disposed; and     a resistance device which is electrically connected to the first and second contact elements,     wherein the resistance device includes a circuit board, an electrical resistor disposed on the circuit board, and a contact spring disposed on the circuit board and electrically connected to the resistor,     wherein the circuit board is retained on the support element,     wherein the contact spring electrically contacts one of the first and second contact elements,     a first and a second contact spring, disposed on the circuit board,     wherein the first contact spring electrically contacts the first contact element, and     wherein the second contact spring electrically contacts the second contact element,     such that the electrical resistor is electrically connected to the first and second contact elements via the first and second contact springs,     wherein the circuit board includes a first side and a second side facing away from the first side, and     wherein the first contact spring is disposed on the first side and the second contact spring is disposed on the second side such that the first and second contact springs project from the circuit board on different sides thereof.

\* \* \* \* \*